United States Patent [19]
Dworak et al.

[11] Patent Number: 5,447,219
[45] Date of Patent: Sep. 5, 1995

[54] POSITIONING MECHANISM FOR HIGH SPEED PACKAGING MACHINERY

[75] Inventors: Adam J. Dworak, Park Ridge; Donn A. Hartman, Gurnee, both of Ill.

[73] Assignee: Cloud Corporation, Des Plaines, Ill.

[21] Appl. No.: 161,430

[22] Filed: Dec. 6, 1993

[51] Int. Cl.6 .............................................. B65G 47/24
[52] U.S. Cl. .................... 198/377; 198/471.1; 198/476.1
[58] Field of Search ............ 198/374, 377, 379, 471.1, 198/474.1, 476.1, 477.1, 803.5; 271/91, 185

[56] References Cited

U.S. PATENT DOCUMENTS

| | | | |
|---|---|---|---|
| 3,837,474 | 9/1974 | Brooke | 198/374 |
| 4,275,807 | 6/1981 | Mohn et al. | 198/377 |
| 4,394,898 | 7/1983 | Campbell | 198/374 |
| 5,025,910 | 6/1991 | Lasure et al. | 198/377 |

Primary Examiner—Joseph E. Valenza
Attorney, Agent, or Firm—Dorn, McEachran, Jambor & Keating

[57] ABSTRACT

A high speed packaging machine for making pouches of fluent material has a transfer wheel that changes the orientation of the finished, individual pouches. The wheel has a plurality of holder shafts rotatably mounted in the transfer wheel. The holder shafts mount vacuum cups for holding a pouch. The holder shafts also have a pinion which is engaged by a gear which in turn is actuated by a cam follower. The cam follower engages a stationary cam and is constrained for movement within a cam path. The cam follower causes rotation of the gear, pinion and holder shaft. The cam follower can be connected to the gear in either a leading or lagging position so the direction of holder shaft rotation can be selected without altering the cam or cam path.

15 Claims, 4 Drawing Sheets

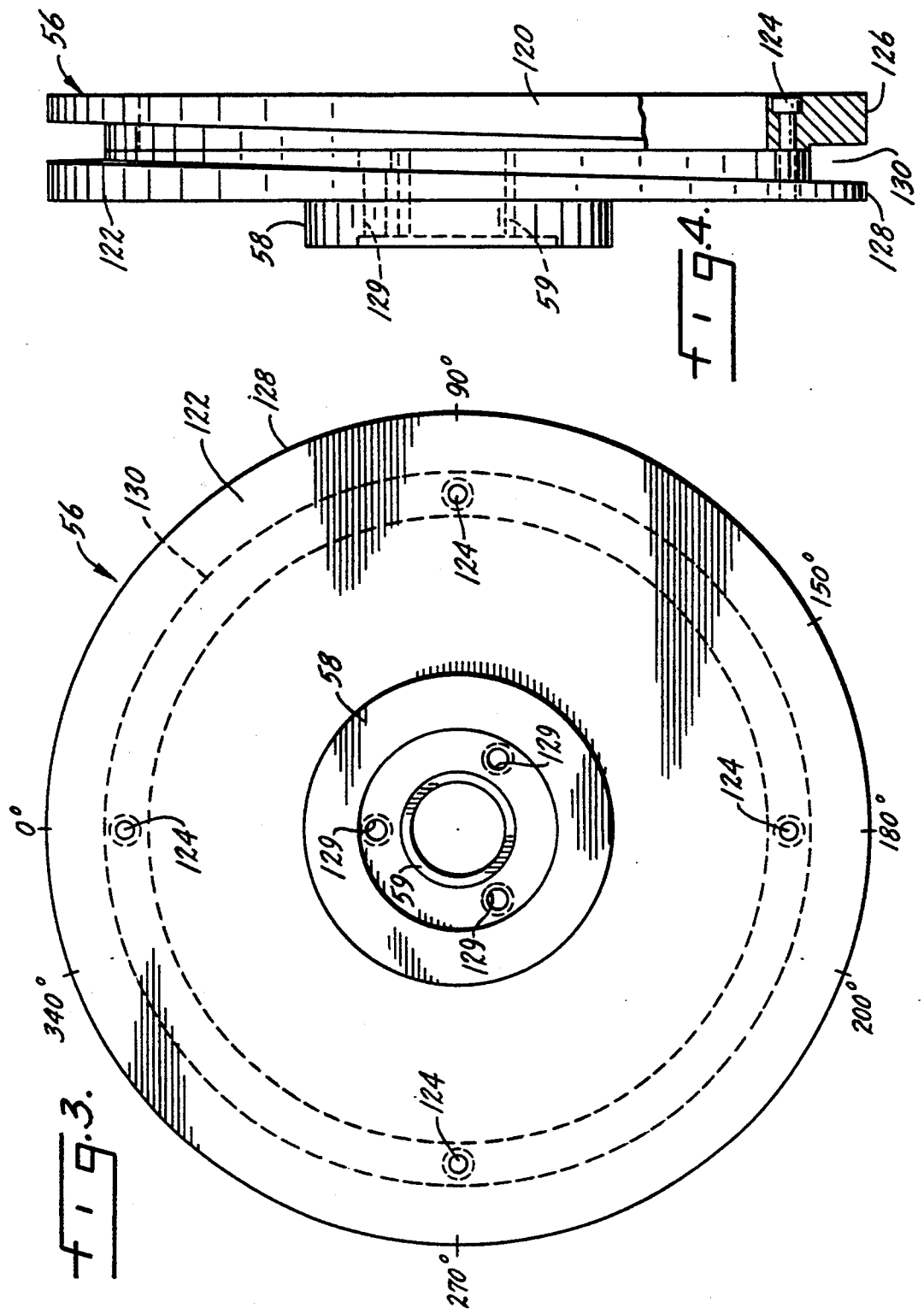

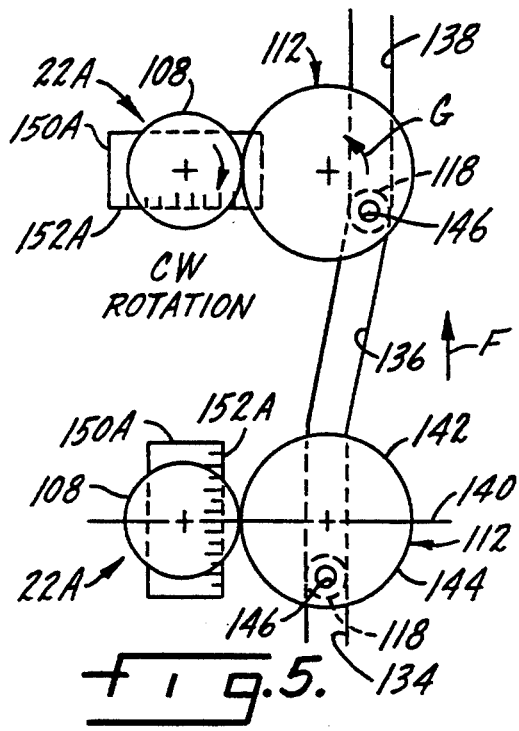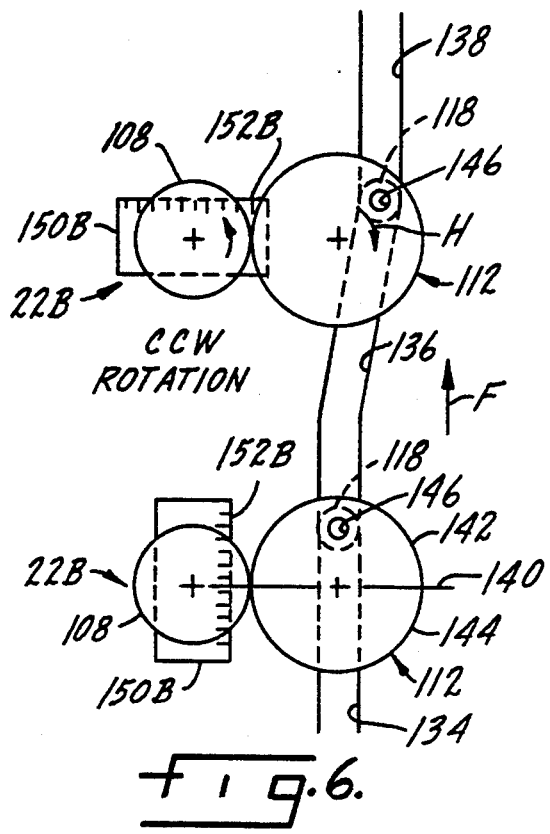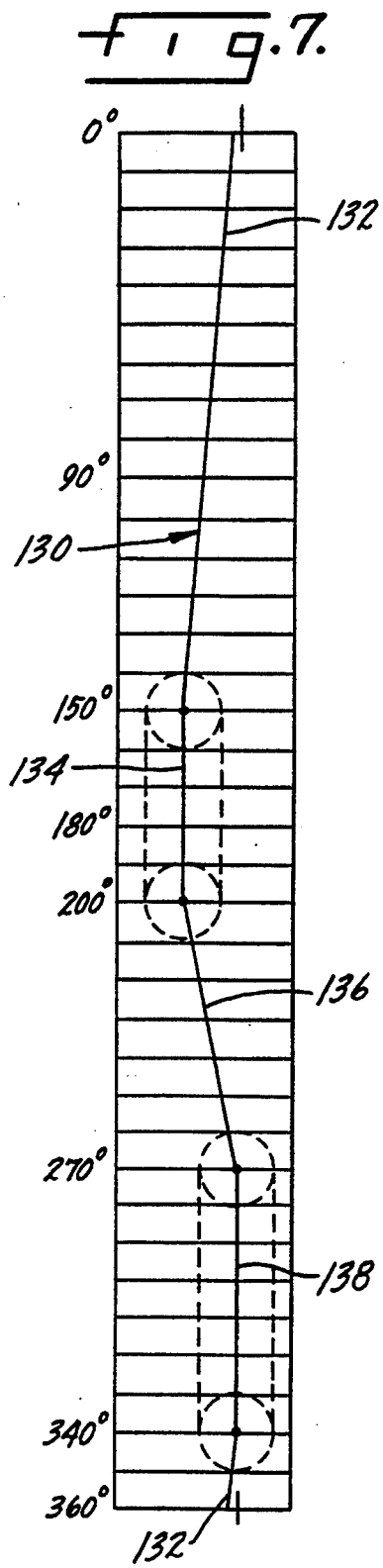

POSITIONING MECHANISM FOR HIGH SPEED PACKAGING MACHINERY

BACKGROUND OF THE INVENTION

This invention relates to a high speed pouch packager for forming and filling pouches or packets. Such pouches are used for a variety of free-flowing products. Condiments such as sugar and sweeteners, coffee and creamers, as well as drink mixes, dietary supplements and tablets are typical products packaged in pouches. Liquids as well as dry products may be packed in the pouches.

Examples of basic pouch forming and filling machines are shown in U.S. Pat. No. 3,344,576, 3,453,799 and 3,667,188, the disclosures of which are incorporated herein by reference. These patents show how a continuous web of pouch material is folded, sealed on two sides, filled through the open top, sealed on top and then severed into individual, filled pouches. The filling process naturally results in a greater portion of the product resting in the bottom portion of the pouch. Accordingly, the bottom of the pouch is often thicker than the top.

This uneven thickness may create problems when many individual pouches are stacked adjacent one another or one on top of the other in a carton or other container. The pouches have a wedge-like shape and will not lay or stand in a uniform stack. If the pouches are laid flat, the stack quickly becomes out of balance, with the upper pouches tending to fall or slide off the stack. These handling difficulties increase the time and cost of packing pouches in cartons.

Another need for turning sometimes arises from the printing on a pouch. Often it is desirable to orient the pouches in a particular way to take advantage of the printing. Turning can also be an advantage when loading rectangular packages into a retail package. That is, it is easier to load a retail package or carton with the long side of a package leading the stream being fed on a conveyor to a carton.

SUMMARY OF THE INVENTION

The present invention relates to high speed packaging machinery of the type used in forming and filling pouches. The invention is particularly concerned with a turning mechanism for changing the orientation of some or all pouches.

A primary object of the invention is a turning mechanism for pouches that can change pouch orientation to provide a thickness-compensated stack of individual pouches or to accomplish any other packaging goal requiring turning.

Another object of the invention is to reduce the linear dimension of a stream of pouches. This is accomplished by turning the long dimension of the pouch transverse to the direction of travel. With the short pouch dimension parallel to the direction of travel more pouches can fit in a given space to facilitate loading into a vertical cartoner.

Still another object of the invention is a method of producing an in-line discharge stream of pouches having the long side of the pouches leading.

A further object of the invention is a turning mechanism of the type described which can be incorporated within the confines of previously-known equipment. That is, the turning mechanism does not require any increase in the floor or table space needed to accommodate the packaging machine.

Another object of the invention is a turning mechanism which can rotate pouches in either a clockwise or counterclockwise direction using a single cam.

These and other objects which may become apparent are realized by a packaging machine having a transfer wheel rotatably mounted in a frame. The transfer wheel has two side plates and an annular hub which define a central cavity. A plurality of holder shafts are mounted for rotation on the hub of the transfer wheel. The holder shafts have vacuum cups for receiving and releasably gripping packages or pouches.

A cutoff wheel adjacent the transfer wheel slices finished pouches from a continuous web. A severed pouch is placed on each holder of the rotating transfer wheel. The transfer wheel carries the pouches to a discharge station, turning the pouches while the wheel rotates. At the discharge station the pouches are released from the holders and placed on a conveyor for further processing.

The turning mechanism for changing the orientation of each holder shaft and its pouch includes a stationary cam mounted within the transfer wheel cavity. The cam has a slot formed therein defining a cam path.

A pinion is fixed to each holder shaft for rotation therewith. A gear engaging the pinion is rotatably mounted to the hub. The gear defines a center line transverse to the direction of the transfer wheel's rotation. The transverse center line defines leading and trailing sides of the gear. The gear has a cam follower mounting hole positioned either on the leading side of the transverse center line or the trailing side of the transverse center line. The hole receives a cam follower. The cam follower extends into contact with the cam slot. Transfer wheel movement relative to the cam causes translation of the cam follower. Translation of the cam follower causes rotation of the gear and pinion, thereby rotating the holder shaft. The direction of rotation is determined by whether the cam follower mounting hole is positioned in the leading or trailing side of the gear.

In one embodiment the gear ratio is chosen to be 2:1 and the cam path is such that the follower rotates the gear 45°. Accordingly, the pinion and holder shaft rotate 90°. The cam followers are arranged in alternate leading and trailing positions so the pouches are rotated 90° in alternate directions. The result is the thick edges of the packages or pouches of adjacent packages are placed on the output conveyor 180° apart. With this orientation they can be stacked or otherwise placed in cartons in a thickness-compensated arrangement.

BRIEF DESCRIPTION OF THE DRAWINGS

FIG. 1A is a perspective view of a shingled stream of packages as they might appear on a discharge conveyor, oriented with their short side leading as in prior art constructions.

Fig. 1B is a perspective view of a shingled stream of packages as they might appear on a discharge conveyor, oriented with their long side leading as in the present invention.

FIG. 3 is a side elevation view of the cam.

FIG. 4 is an end elevation of the cam, with parts in section.

FIG. 5 is a schematic view of a gear and pinion, shown in successive positions (the gears moving from the bottom to the top of the Figure), with the cam path laid flat and with the cam follower in a trailing mounting hole in the gear.

FIG. 6 is a schematic view of a gear and pinion, similar to FIG. 5, with the cam follower in a leading mounting hole in the gear.

FIG. 7 is a schematic representation of the cam path, showing the follower displacement profile.

DETAILED DESCRIPTION OF THE INVENTION

Figure 1:
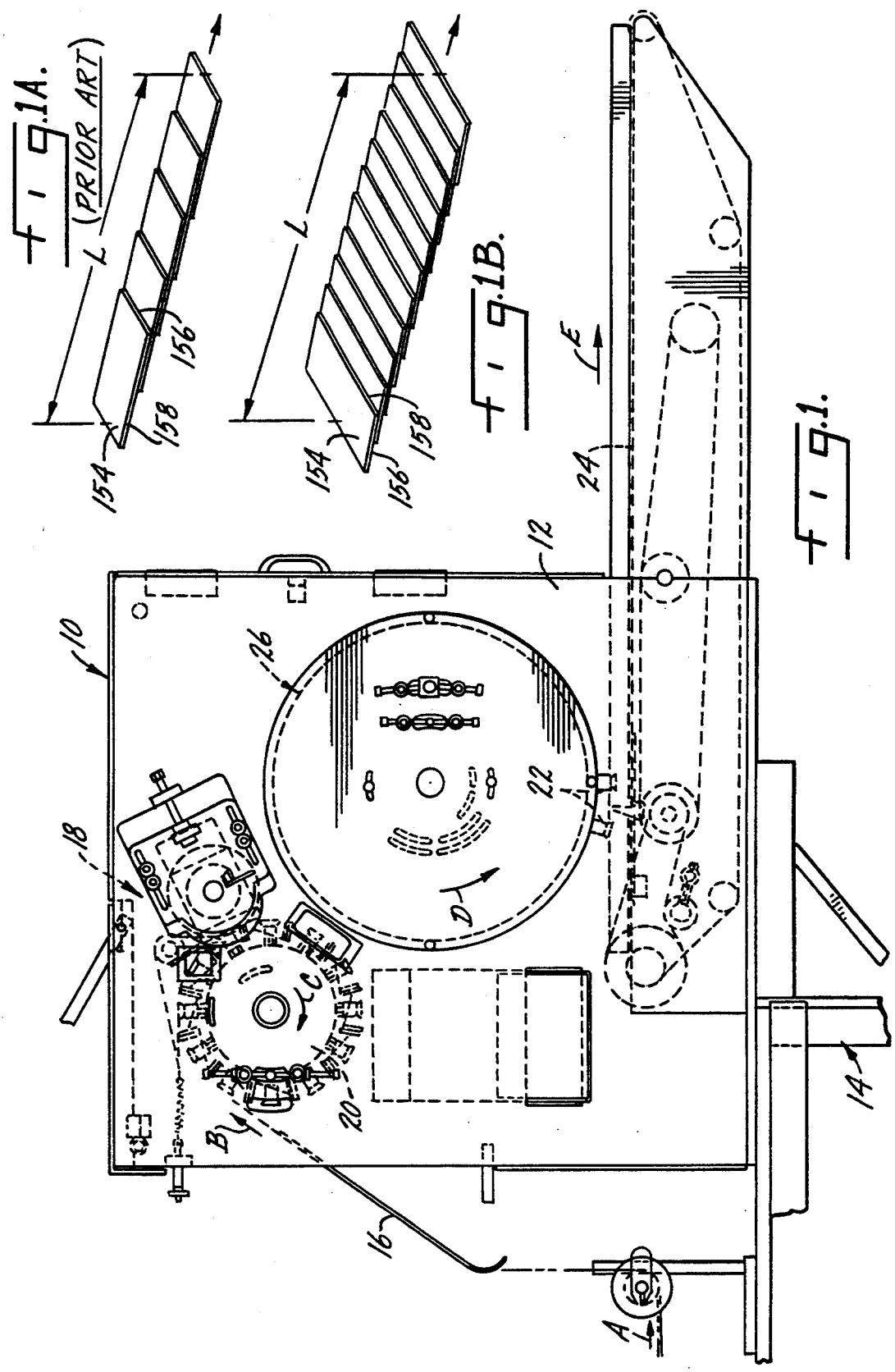
FIG. 1 is a side elevation view of the knife and conveyor portion of a pouch packaging machine, showing the turning mechanism of the present invention.

FIG. 1 shows a pouch machine knife 10 located downstream of the filler and top seal stations. The knife has a framework 12 mounted on a table top 14. An uncut band or web of filled and sealed pouches moves from the top seal station as indicated by arrow A, up a ramp 16 as indicated by arrow B, and into a rotary knife assembly 18. The pouches are picked up by suction cups on the major wheel 20 which rotates in the direction of arrow C. Angled knives and guides meet and shear the pouches through the side seals to separate them into individual pouches. A vacuum supplied to the suction cups holds the pouches on the major wheel until they reach an input area or zone where the vacuum is released and the pouches are transferred to the turning mechanism of the present invention.

Although the turning mechanism is shown in FIG. 1 only schematically by holders 22, it will be understood that the turning mechanism rotates in the direction of arrow D to carry the pouches from the input area to a discharge means for releasing the packages from the holders. Then the pouches are placed on an output means, in this case a conveyor 24, which receives discharged packages and advances them in the direction of arrow E for further processing. It is important to note that the conveyor carries the discharged packages in a direction parallel to the infeed of the web. This is referred to as an in-line discharge. In-line discharge is advantageous from the standpoint of floor space usage.

Figure 2:
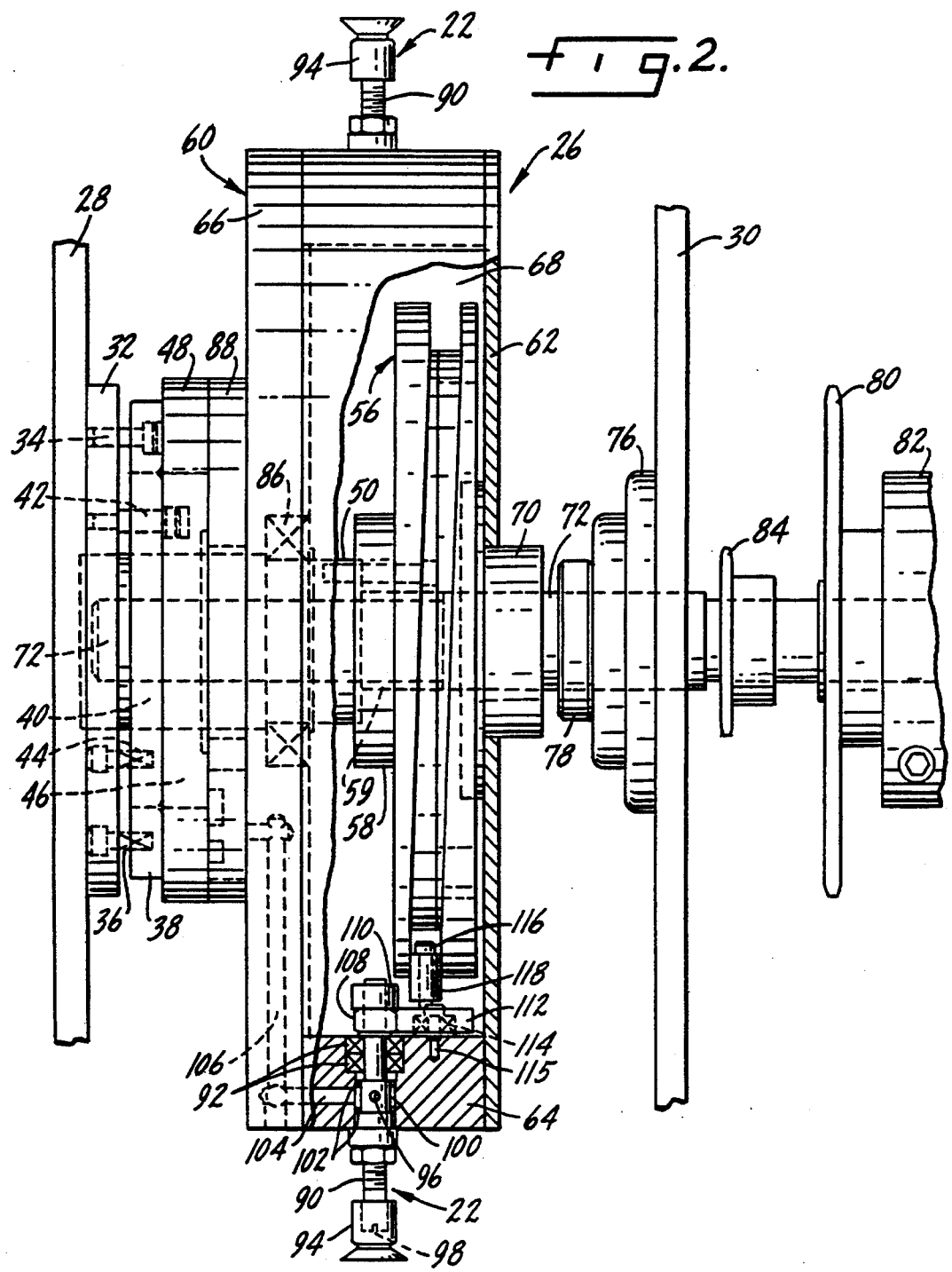
FIG. 2 is an end elevation view, on an enlarged scale and looking from the right end of FIG. 1, of the turning mechanism.

Looking now at FIG. 2, details of the turning mechanism 26 can be seen. The framework 12 includes first and second upright frame plates 28 and 30. These plates support the turning mechanism 26 as well as the rotary knife assembly 18 and the major wheel 20. A shaft support structure (not shown) extends from the frame plate 30 to the right of FIG. 2 to mount a bearing as explained further below. The portion of plate 28 shown is actually bolted into an opening in a larger plate to provide access to the space between plates 28 and 30.

A vacuum positioning plate 32 is attached to the first frame plate 28. Shoulder bolts 34 and compression springs 36 join an outer pressure plate 38 to the positioning plate 32. An inner pressure plate 40 is similarly attached by shoulder bolts 42 and compression springs 44. Bolts 42 also attach a transfer wheel inner shoe 46 to the inner pressure plate 40. A transfer wheel outer shoe 48 surrounds the inner shoe 46. All of these plates or shoes 32, 38, 40, 46 and 48 remain stationary.

Aligned, central openings extend through the vacuum positioning plate 32, the inner pressure plate 40 and the transfer wheel inner shoe 46 to receive a vacuum/cam support member 50. The member 50 itself has a central bore in which a transfer wheel drive shaft 72 is disposed, with sufficient clearance to allow rotation of the shaft. The drive shaft 72 terminates on the left near the frame plate 28 and extends to the right beyond the frame plate 30.

A circular cam 56 has a hub 58 which is bolted to the end face of the vacuum/cam support member 50. The drive shaft 72 extends through a central opening in the cam 56. A bushing 59 is disposed between shaft 72 and the cam 56. Further details of the cam will be described below. The vacuum/cam support member 50 remains stationary during operation of the transfer wheel. Accordingly, the cam 56 also remains stationary at all times.

The moving parts of the turning mechanism include the transfer wheel, indicated generally at 60. The transfer wheel includes three main parts, a driver side plate 62, an annular main hub 64 and a main side plate 66. Together these parts define an internal cavity 68. It is pointed out that the cam 56 is disposed entirely within the transfer wheel cavity.

The driver side plate has a side plate hub 70 attached thereto. Hub 70 is also keyed or otherwise fixed to the drive shaft 72. Drive shaft 72 is supported in a first bearing 76 which is attached to frame plate 30. A second bearing (not shown) for the drive shaft 72 is located to the right of an overload clutch 82. The second bearing is mounted in the shaft support structure referred to above. This support structure is somewhat U-shaped in plan view to accommodate the clutch 82 within the confines of the support structure.

A collar 78 fixed to the drive shaft 72 prevents longitudinal movement. A drive sprocket 80 is mounted on drive shaft 72. A chain (not shown) from a suitable drive motor or the like drives sprocket 80 and shaft 72. Further components of the drive train include the overload clutch 82 and a small sprocket 84 for connection to the output conveyor 24.

The main side plate 66 has a counterbore for receiving a ball bearing 86. The outer race of the bearing is attached to the side plate 66 while the inner race rests on the vacuum/cam support member 50. A third wheel wear plate 88 is attached to the outside of the main side plate 66, adjacent the transfer wheel inner and outer shoes 46, 48.

Looking now at details of the holders 22, each holder has a shaft in the form of a suction screw 90, mounted for rotation in bearings 92 and extending through the hub 64 into the transfer wheel cavity 68. The outer end of the suction screw 90 carries a vacuum cup 94. A vacuum source communicates with the cup through a port 96 and longitudinal passage formed in the suction screw. The terminus of the passage can be seen at 98. The port 96 opens into a chamber 100 formed in the hub 64. 0-rings 102 seal the chamber. A passage 104 connects the chamber 100 to vacuum supply passage 106 in the main side plate 66.

The transfer wheel also has conversion means for converting transverse motion of a cam follower to rotation of the holder suction screw. The conversion means includes a pinion 108 fixed by a collar 110 to the portion of the holder suction screw 90 that extends into the cavity 68. The pinion 108 engages a gear 112 which rotates on a bearing 114. A bolt 115 fixes the gear 112 and bearing to the hub 64. A cam follower which is mounted on gear 112 includes a shoulder bolt 116 and roller 118. The shoulder bolt is threaded into the gear in a mounting hole formed in the gear. The roller 118 is free to rotate on the bolt 116. Further details of the gear and its mounting hole will be described below.

The cam follower extends upwardly from the gear into a cam path defined by a slot in the cam. Thus, the cam follower is constrained for movement with the cam path. Details of the cam 56 are shown in FIGS. 3 and 4. The cam is made up of two side-by-side plates 120 and 122. The plates are held together by bolts 124. The two plates are machined to define peripheral edges 126 and 128. When the plates are bolted together the cam path 130 is defined between the edges 126 and 128 of the plates. The hub 58 is attached to the vacuum support member 50 by bolts which fit through holes 129 (FIG. 3).

The shape of the cam path 130 is diagrammed in FIG. 7. The path includes a reset lobe 132 from 340° to 150°. From 150° to 200° there is a pickup dwell 134. An actuating lobe 136 follows from 200° to 270°. A discharge dwell 138 extends from 270° to 340° and at that point the reset lobe 132 begins. It will be noted that the pickup dwell 134 and discharge dwell 138 extend parallel to the diametral plane of the cam while the actuating lobe 136 and reset lobe 132 are angled with respect to such plane. Thus, when the transfer wheel causes the cam followers to rotate around the circumference of the cam, the followers will be translated laterally, i.e., in a direction parallel to the drive shaft, by the actuating and reset lobes. The followers will not be translated laterally at the pickup and discharge dwells.

A further aspect of the construction of the gears 112 is shown in FIG. 5. Each gear 112 defines a center line 140 transverse to the direction of the transfer wheel's rotation, such direction being indicated by arrow F. The transverse center line 140 defines leading and trailing sides of the gear, 142 and 144, respectively. The gear has a cam follower mounting hole 146 on the trailing side 144 of the transverse center line. The cam follower shoulder bolt is threaded into this hole. It will be noted in FIG. 6 that the hole 146 is positioned on the leading side of the gear. The positioning of the hole on the leading or trailing side of the gear determines the direction of rotation as will be explained.

The use, operation and function of the invention are as follows. The drive train of the knife 10 causes rotation of the minor knife assembly 18, the major wheel 20 and the transfer wheel 60. In the case of the transfer wheel, its drive shaft 72 is driven by a chain on sprocket 84. Filled, sealed pouches are placed on the major wheel 20, severed into individual pouches at the minor knife assembly 18 and carried to the transfer wheel 60. Rotation of the transfer wheel moves the holders 22 past the major wheel 20. After packages have been cut they are passed off from the major wheel to the transfer wheel 60. The input area coincides with the pickup dwell 134 of the cam path. A vacuum is supplied to the cups 94 of the holders 22 to retain the pouches on the cups as they move toward the discharge conveyor 24.

FIG. 5 shows a holder 22A holding a pouch 150A with a top seal edge 152A. The shoulder bolt of the associated cam follower is placed in the mounting hole 146, which is in the trailing side of the gear. As the holder 22A moves in the direction of arrow F, the follower engages the actuating lobe 136, causing translation of the follower to the right, as seen in FIG. 5. By virtue of the mounting hole and follower being located in the trailing side of the gear, the gear 112 rotates in the direction of arrow G. The pinion produces a clockwise rotation with the pouch obtaining the orientation shown in the upper holder in FIG. 5, top seal edge 152A trailing.

FIG. 6 illustrates how a holder 22B can be made to rotate the pouch oppositely to the rotation of FIG. 5. By placing the mounting hole 146 and cam follower in the leading side of the gear, the follower's engagement with the actuating lobe 136 causes a clockwise rotation of the gear 112. Note arrow H. Accordingly, holder 22B starts at the bottom of FIG. 6 with pouch 150B having top seal edge 152B on the right. Movement of the holder to the top of FIG. 6 causes a counterclockwise rotation of the pinion and pouch, so the top seal edge ends up leading.

Once the holder and pouch reach the discharge zone the vacuum on the cups is released and the pouches fall off onto the discharge conveyor. This takes place at the discharge dwell 138 section of the cam path. Thereafter the reset lobe 132 restores the cam follower to a position where it is once again prepared to enter the pickup dwell area.

It can be seen that the ability to locate the cam follower mounting hole in either a leading or trailing position allows a single cam path and a single gear to be used to produce rotations in either direction. In the embodiment shown the actuating lobe produces a 45° rotation of the gear. A 2:1 gear ratio between gear 112 and pinion 108 results in the pinion, holder shaft, vacuum cup and pouch all rotating 90°. With this arrangement, half the holders will be set up with followers leading, and the remaining holders will have their followers trailing, preferably alternately so. The top seal edges of adjacent pouches will then end up on opposite sides as they come out of the transfer wheel.

It is pointed out that this result is achieved with a cam and conversion means that fits inside the transfer wheel. No additional space is required for the turning equipment.

FIGS. 1A and 1B illustrate one of the advantages afforded by the present invention. Both figures show a stream of pouches or packages as they might appear on the discharge conveyor 24. The pouches 154 are rectangular, each pouch having a short side 156 and a long side 158. In FIG. 1A the pouches are oriented as in prior art machines, with the short side leading in the direction of travel. For a given length L and a given degree of overlap or shingling (50% is shown in the drawings), five pouches can fit in the stream. In Fig. 1B the pouches in the discharge stream are oriented as in the present invention, with the long side leading. This places the short side parallel to the direction of travel and reduces the amount of space required. For the same length L and 50% shingling, eleven pouches can fit in the stream. Thus, the turning mechanism of the present invention affords a more compact stream which facilitates loading into a vertical cartoner or other device.

It is also pointed out that the compact discharge stream comes out in an in-line direction. That is, the discharge stream is parallel to the direction of the input of the web into the knife 10. Only the turning mechanism makes this possible in the most common situation wherein the pouches are formed in the web with short sides leading. Pouches are normally made this way because it makes an opening on the long side available for filling. Thus, the present invention makes possible a knife assembly having a short side leading input (the best arrangement for filling), a long side leading output (the best arrangement for loading, especially into retail cartons) and an in-line output (the best arrangement for conserving floor space).

While a preferred form of the invention has been shown and described, it will be realized that alterations may be made thereto without departing from the scope of the following claims. For example, the cam path and gear ratio could be chosen to rotate a pouch 180°. Only half of the pouches would be so rotated.

We claim:

1. In high speed packaging machinery of the type having a transfer wheel rotatably mounted in a framework, the transfer wheel defining a central cavity, a plurality of holders mounted on the outer periphery of the transfer wheel for receiving and releasably gripping packages, input means adjacent the transfer wheel for supplying one package to each holder passing by the input means, discharge means for releasing the packages from the holders, and output means for receiving discharged packages for further processing, the improvement comprising a turning mechanism for changing the orientation of each holder and its package as the holder and package move from the input means to the discharge means, the turning mechanism comprising:

a plurality of holder shafts mounted for rotation in the transfer wheel, a holding means being attached to each holder shaft;

a cam mounted within the central cavity of the transfer wheel and defining a cam path;

a plurality of conversion means, one for each holder shaft, mounted on the transfer wheel and engageable with a holder shaft, each conversion means including a cam follower held in contact with the cam path so as to cause translation of the cam follower as the transfer wheel moves relative to said path, the cam follower being positionable on the conversion means in either a leading or trailing position with the cam followers on successive conversion means being arranged in alternating leading and trailing positions, the conversion means being operable to convert translation of the cam follower to a 90° rotation of the holder shaft, with the direction of rotation determined by the position of the cam follower.

2. The turning mechanism of claim 1 wherein the cam path comprises a pickup dwell, an actuating lobe, a discharge dwell and a reset lobe.

3. The turning mechanism of claim 1 wherein the conversion means further comprises a pinion attached to each holder shaft, and a gear mounted for rotation on the transfer wheel and engageable with the pinion.

4. The turning mechanism of claim 3 wherein the cam follower comprises a roller rotatably mounted on a shoulder bolt which is connected to the gear.

5. The turning mechanism of claim 3 wherein the ratio between the gear and pinion is 2:1.

6. The turning mechanism of claim 1 wherein the transfer wheel comprises a driver side plate, an annular main hub and a main side plate having an opening therethrough.

7. The turning mechanism of claim 6 further comprising a vacuum/cam support member attached to a first frame member, a bearing mounted on the vacuum/cam support member and disposed in said main side plate opening to rotatably support the transfer wheel.

8. The turning mechanism of claim 1 further characterized in that the holder shafts have vacuum passages therein.

9. The turning mechanism of claim 1 wherein the cam is generally circular and the cam path is defined by a slot formed in the periphery of the cam.

10. In high speed packaging machinery of the type having a transfer wheel rotatably mounted in a frame, the transfer wheel defining a central cavity, a plurality of holders mounted on the outer periphery of the transfer wheel for receiving and releasably gripping packages, input means adjacent the transfer wheel for supplying one package to each holder passing by the input means, discharge means for releasing the packages from the holders, and output means for receiving discharged packages for further processing, the improvement comprising a turning mechanism for changing the orientation of each holder and its package as the holder and package move from the input means to the discharge means, the turning mechanism comprising:

a plurality of holder shafts mounted for rotation in the transfer wheel, a holding means being attached to each holder shaft;

a cam mounted adjacent the transfer wheel and defining a cam path;

a pinion fixed to each holder shaft and a gear engaging the pinion, the gear defining a center line transverse to the direction of the transfer wheel's rotation, the transverse center line defining leading and trailing sides of the gear, the gear having a cam follower mounting hole located on one of the leading side of the transverse center line or the trailing side of the transverse center line, the cam follower mounting holes of successive gears being arranged in alternating leading and trailing positions;

a cam follower mounted in the mounting hole of each gear and extending into contact with the cam path so as to cause translation of the cam follower as the transfer wheel moves relative to said path, the cam follower, gear and pinion being operable to convert translation of the cam follower to a 90° rotation of the holder shaft, with the direction of rotation determined by the position of the hole in either the leading or trailing side of the gear.

11. The turning mechanism of claim 10 wherein the transfer wheel comprises a driver side plate, an annular main hub and a main side plate having an opening therethrough.

12. The turning mechanism of claim 11 further comprising a vacuum/cam support member attached to a first frame member, a bearing mounted on the vacuum/cam support member and disposed in said main side plate opening to rotatably support the transfer wheel.

13. The turning mechanism of claim 10 further characterized in that the holder shafts have vacuum passages therein.

14. The turning mechanism of claim 10 wherein the cam is generally circular and the cam path is defined by a slot formed in the periphery of the cam.

15. In high speed packaging machinery of the type having a transfer wheel rotatably mounted in a frame, the transfer wheel defining a central cavity, a plurality of holders mounted on the outer periphery of the transfer wheel for receiving and releasably gripping packages, input means adjacent the transfer wheel for supplying one package to each holder passing by the input means, discharge means for releasing the packages from the holders, and output means for receiving discharged packages for further processing, the improvement comprising a turning mechanism for changing the orientation of each holder and its package as the holder and package move from the input means to the discharge means, the turning mechanism comprising:

a plurality of holder shafts mounted for rotation in the transfer wheel, a holding means being attached to each holder shaft;

a cam mounted adjacent the transfer wheel and defining a cam path;

a pinion fixed to each holder shaft and a gear engaging the pinion, the gear defining a center line transverse to the direction of the transfer wheel's rotation, the transverse center line defining leading and trailing sides of the gear, the gear having a cam follower mounting hole located on one of the leading side of the transverse center line or the trailing side of the transverse center line, the gear being directly connected to the cam by a cam follower mounted in the mounting hole of each gear, the cam follower extending into contact with the cam path so as to cause translation of the cam follower as the transfer wheel moves relative to said path, the cam follower, gear and pinion being operable to convert translation of the cam follower to rotation of the holder shaft, with the direction of rotation determined by the position of the hole in either the leading or trailing side of the gear.

* * * * *